United States Patent [19]

Mueller et al.

[11] Patent Number: 5,318,954
[45] Date of Patent: * Jun. 7, 1994

[54] USE OF SELECTED ESTER OILS OF LOW CARBOXYLIC ACIDS IN DRILLING FLUIDS

[75] Inventors: Heinz Mueller, Monheim; Claus-Peter Herold, Mettmann; Stephan von Tapavicza, Erkrath; Michael Neuss, Cologne; Frank Burbach, Meersbusch, all of Fed. Rep. of Germany

[73] Assignee: Henkel Kommanditgesellschaft auf Aktien, Dusseldorf, Fed. Rep. of Germany

[*] Notice: The portion of the term of this patent subsequent to Oct. 19, 2010 has been disclaimed.

[21] Appl. No.: 84,783

[22] Filed: Jun. 29, 1993

Related U.S. Application Data

[63] Continuation of Ser. No. 752,694, Sep. 6, 1991, abandoned.

[30] Foreign Application Priority Data

Mar. 8, 1989 [DE] Fed. Rep. of Germany ....... 3907391

[51] Int. Cl.$^5$ .............................................. C09K 7/06
[52] U.S. Cl. .................................................. 507/138
[58] Field of Search ........................................ 507/138

[56] References Cited

U.S. PATENT DOCUMENTS

| | | | |
|---|---|---|---|
| 1,999,147 | 4/1935 | Ambrose et al. | 252/8.5 |
| 2,661,334 | 12/1953 | Lummus | 252/8.5 |
| 3,062,740 | 11/1962 | Reddie et al. | 252/8.5 |
| 3,244,638 | 4/1966 | Foley et al. | 252/8.5 |
| 3,761,410 | 9/1973 | Mondshine et al. | 252/8.5 |
| 4,409,108 | 10/1983 | Carney et al. | 507/138 |
| 4,631,136 | 12/1986 | Jones, III | 507/138 |
| 4,839,096 | 6/1989 | Dennis et al. | 507/136 |

Primary Examiner—Gary Geist
Attorney, Agent, or Firm—Ernest G. Szoke; Wayne C. Jaeschke; Real J. Grandmaison

[57] ABSTRACT

The invention describes the use of selected esters, fluid at room temperature and with flash points above 80° C., of $C_{1-5}$-monocarboxylic acids and mon- and/or polyfunctional alcohols as the oil phase, or a component of the oil phase of invert drilling muds which are suitable for environment-friendly development of petroleum or natural gas deposits and contain in a continuous oil phase a dispersed aqueous phase together with emulsifiers, weighting agents, fluid-loss additives and preferably further conventional additives. In a further embodiment the invention relates to invert drilling fluids of the type described, which are characterized in that the oil phase contains esters from $C_{1-5}$-monocarboxylic acids with mono- and/or polyfunctional alcohols preferably in admixture with other components from the class of ecologically acceptable compounds.

30 Claims, No Drawings

USE OF SELECTED ESTER OILS OF LOW CARBOXYLIC ACIDS IN DRILLING FLUIDS

This application is a continuation of application Ser. No. 07/752,694 filed on Sep. 6, 1991, now abandoned.

BACKGROUND OF THE INVENTION

1. Field of the Invention

The invention discloses new drilling fluids based on ester oils and invert drilling muds built up thereon, which are distinguished by high ecological acceptability and at the same time good keeping and application properties. An important area of application for the new drilling fluid systems is in off-shore wells for the development of petroleum and/or natural gas deposits, the aim of the invention being particularly to make available technically usable drilling fluids with high ecological acceptability. The use of the new drilling fluid systems has particular significance in the marine environment, but is not limited thereto. The new mud systems can be put to quite general use even in land-based drilling, for example, in geothermal wells, water boreholes, in the drilling of geoscientific bores and in drilling for the mining industry. Here too it is essentially true that associated ecotoxic problems are substantially simplified by the ester-based drilling oil fluids selected according to the invention.

2. Discussion of Related Art

Oil-base drilling fluids are generally used as so-called invert-emulsion muds, which consist of a three-phase system; oil, water and finely particulate solids. These are preparations of the W/O emulsion type, i.e. the aqueous phase is distributed as a heterogeneous fine dispersion in the continuous oil phase. A number of additives can be used to stabilize the system as a whole and to adjust the described application properties, particularly emulsifiers or emulsifier systems, weighting agents, fluid-loss additives, alkali reserves, viscosity regulators and the like. For details, refer, e.g., to the publication by P. A. Boyd et al. "New Base Oil Used in Low-Toxicity Oil Muds" Journal of Petroleum Technology, 1985, 137 to 142, and R. B. Bennett, "New Drilling Fluid Technology—Mineral Oil Mud" Journal of Petroleum Technology, 1984, 975 to 981 and the literature cited therein.

The relevant technology has for some time recognized the importance of ester-based oil phases in reducing the problems caused by such oil-base muds. For example, U.S. Pat. Nos. 4,374,737 and 4,481,121 disclose oil-base drilling fluids in which non-polluting oils are to be used. The following are mentioned as non-polluting oils of equal value —mineral oil fractions free from aromatic hydrocarbons and vegetable oils such as peanut oil, soybean oil, linseed oil, corn oil, rice oil or even oils of animal origin, such as whale oil. Without exception, these named ester oils of vegetable and animal origin are triglycerides of natural fatty acids, which are known to have a high environmental acceptability, and are clearly superior from the ecological viewpoint when compared with hydrocarbon fractions—even when these are free from aromatic hydrocarbons.

Interestingly enough, however, none of the examples in the aforementioned U.S. Patent Specifications describes the use of such natural ester oils in invert-drilling fluids such as those in question here. In all cases, mineral oil fractions are used as the continuous oil phase. Oils of vegetable and/or animal origin are not considered for reasons of practicality. The rheological properties of such oil phases cannot be controlled for the wide temperature range reaching from 0° to 5° C. on the one hand up to 250° C. on the other hand, which is widely required in the industry.

In use, ester oils of the type in question do not in fact behave in the same way as the mineral oil fractions based on pure hydrocarbon which were previously used. Ester oils are subject to partial hydrolysis in practical use also and particularly in W/O invert drilling muds. Free carboxylic acids are formed as a result. The earlier Applications P 38 42 659.5 and P 38 42 703.6 (U.S. Ser. No. 07/452,457 titled "The Use of Selected Ester Oils in Drilling Fluids and Muds" and U.S. Ser. No. 07/452,988 titled "Drilling Fluids and Muds Containing Selected Ester Oils") described the problems caused thereby and give suggestions for their solution.

The subject of these earlier Applications is the use of ester oils based on selected monocarboxylic acids or monocarboxylic acid mixtures and monofunctional alcohols with at least 2, and preferably with at least 4 carbon atoms. The earlier applications show that with the esters and ester mixtures they disclose, monofunctional reactants can not only be given satisfactory rheological properties in fresh drilling fluid, but that by using selected known alkali reserves it is possible to work with the drilling fluid and in this way to inhibit undesirable corrosion. For the alkali reserve, one can add calcium hydroxide or lime and/or use zinc oxide or comparable zinc compounds. However, in this case an additional restriction is advisable. If undesired thickening of the oil-base invert-mud system is to be prevented in practical use, the amount of alkalizing additive and in particular the amount of lime must be limited. The maximum amount provided is set at about 2 lb/bbl oil-base mud in the disclosure of the aforementioned earlier Applications.

DESCRIPTION OF THE INVENTION

Other than in the operating examples, or where otherwise indicated, all numbers expressing quantities of ingredients or reaction conditions used herein are to be understood as modified in all instances by the term "about".

The teaching of the present invention intends to avoid the problems described above by suing in the drilling fluids of the aforementioned type a class of ester coils which forms non-problematical carboxylic acids and carboxylic-acid salts during the limited ester hydrolysis which always occurs. This idea can be technically realized by the selection of ester oils which are based on lower carboxylic acid are 1 to 5 carbon atoms. The corresponding esters from acetic acid are particularly significant here. The acetate salts which form during the partial hydrolysis of the ester oil do not have the emulsifying properties which could substantially disturb the W/O system.

The subject of the invention is accordingly, in a first embodiment, the use of esters, fluid at room temperature and having flash points above 80° C., from $C_{1-5}$-monocarboxylic acids and mono- and/or polyfunctional alcohols as the oil phase or as a component of the oil phase of invert-drilling muds, which are suitable for an environment-friendly development of petroleum or natural gas deposits, and in a continuous oil phase contain a dispersed aqueous phase together with emulsifiers, weighting agents, fluid-loss additives and preferably further conventional additives.

In a further embodiment the invention relates to invert-drilling fluids which are suitable for the purpose indicated and contain, in a continuous oil phase, a dispersed aqueous phase together with the additives mentioned, and which are characterized in that the oil phase consists at least partly of the above esters of $C_{1-5}$-monocarboxylic acids with mono- and/or polyfunctional alcohols.

The substance properties of the monocarboxylic acid esters of the type referred to in the invention can be so controlled by the selection of the alcohol components used for the esterification, that it is possible to use them as described in the invention. Corresponding esters of ester mixtures are preferably used which are fluid and pumpable even in the temperature range of 0° to 5° C. It is also preferred to use as the oil phase $C_{1-5}$-monocarboxylic acid esters or their admixtures with ecologically acceptable components from the class of so-called nonpolluting oils, which in the temperature range of 0° to 5° C. posses a Brookfield (RVT) viscosity of not above 50 mPas and preferably not above 40 mPas. The viscosity of the oil phase is preferably at most about 30 mPas.

The $C_{1-5}$-carboxylic-acid esters used in the drilling mud of the invention usefully have solidification values (pour and setting point) below 0° C., preferably below $-5°$ C. and particularly below $-10°$ C. At the same time, particularly for safety reasons, the flash points of these esters are to be selected as high as possible so that preferred limit values for the flash point lie at about 90° C. and preferably above 100° C.

The esters of the lower carboxylic acids suitable according to the invention can be divided into two sub-classes. In a first class the lower monocarboxylic acids are reaction products of monofunctional alcohols. In this case the carbon number of the alcohol is at least 6, but is preferably higher, i.e. at least 8 to 10 carbon atoms. The second sub-class of the ester oils referred to here uses polyfunctional alcohols as the ester-forming components. Particularly to be considered here are di- to tetra-hydric alcohols, lower alcohols of this type, preferably with 2 to 6 carbon atoms, being particularly suitable. Typical examples of such poly-hydric alcohols are glycol and/or propanediols. Both ethylene glycol and 1,2-propanediol and/or 1,3-propanediol are particularly alcohols, completely esterified reaction products are preferred, even though the invention—in particular in the case of the polyfunctional alcohols—is not limited thereto. In the latter case in particular, the use of partial ester of such higher valency polyfunctional alcohols with the lower carboxylic acids mentioned can be considered.

The most important esters for the teaching of the invention are derived from monocarboxylic acids with 2 to 4 carbon atoms, with acetic acid, already mentioned, being of particular importance as the ester-forming component.

When selecting the appropriate alcohols it is important to take account of the following additional considerations: When the ester oil is used in practice, as a rule it is not possible to exclude partial saponification of the ester. Free alcohols form, in addition to the free carboxylic acids thus formed or carboxylic acid salts forming together with the alkali reserves. They should be selected such that even after partial hydrolysis operational conditions are ensured which are ecologically and toxicologically harmless, with inhalation-toxicological considerations in particular being taken into account. The alcohols used for the ester formation should in particular possess such a low volatility that in the free state under conditions to be expected in practice, they do not result in any nuisance on the working platform. For the class of ester oils based on very short-chain monocarboxylic acids which are selected in the invention, it is necessary from the outset to use comparatively long-chain monofunctional alcohols, so as to reduce sufficiently the volatility of the ester oil. The considerations discussed here are therefore particularly important in cases in which ester oils of the type defined in the invention are used in blends with other mixture components, in particular other carboxylic acid esters. In the invention it is regarded as particularly important in the preferred embodiment that even after partial hydrolysis in use, the drilling fluids are ecologically and toxicologically harmless, particularly inhalation-toxicologically harmless under working conditions.

Suitable alcohols, particularly suitable monofunctional alcohols can be of natural and/or synthetic origin. Straight-chain and/or branched alcohols can be used here. The chain length in the presence of predominantly aliphatic-saturated alcohol is preferably from 8 to 15 carbon atoms. In any case olefin mon- and/or poly-unsaturated alcohols are also suitable, such as can be obtained, for example, by the selective reduction of naturally occuring unsaturated alcohols such as this can also have higher carbon numbers in the ester oils according to the invention, for example, up to 24 carbon atoms.

Ester oils of the type mentioned here can from the whole of the continuous oil phase of the W/O invert mud. On the other hand there is an industrial process in the scope of the invention in which the carboxylic-acid esters defined in the invention only constitute a mixture component of the oil phase. Practically any of the oil components previously known and/or previously described in the relevant area of application are suitable as further oil components. Particularly suitable mixture components will be discussed below.

The ester oils according to the invention are as a rule homogeneously miscible with the mixture components in any desired mixture ratios. It is useful in the framework of the invention for at least about 25% and particularly at least about a third of the oil phase to be in the form of the $C_{1-5}$-ester oils. In important embodiments of the invention these ester oils form the main part of the oil phase.

Mixture components in the oil phase

Suitable oil components for admixture with the monocarboxylic acid esters of the invention are the mineral oils currently used in practice in drilling fluids, and preferably the aliphatic and/or cycloaliphatic hydrocarbon fractions essentially free from aromatic hydrocarbons and with the required rheological properties. Refer here to the prior-art publications cited and the available commercial products.

Particularly important mixture components are, however, ester oils which are ecologically acceptable when used according to the invention, as described, for example, in the above earlier Applications . . . (U.S. Ser. Nos. 07/452,457 and 07/452,888) both abandoned. To complete the invention disclosure, essential characteristics of these esters or ester mixtures are briefly summarized below.

As the oil phase, in a first embodiment, esters are used of monofunctional alcohols with 2 to 12, particularly with 6 to 12 carbon atoms and aliphatic saturated monocarboxylic acids with 12 to 16 carbon atoms, which esters are fluid and pumpable in the temperature range of 0° to 5° C., or an admixture thereof with at most about the same amounts of other monocarboxylic acids. Ester oils are preferred which at least to about 60% by weight—referred to the respective carboxylic acid mixture—are esters of aliphatic $C_{12-14}$-monocarboxylic acids and preferably for the remaining percentage are based on lower amounts of shorter-chain aliphatic and/or longer chain, and in particular olefin mono- or poly-unsaturated monocarboxylic acids. Esters are preferably used which in the temperature range of 0° to 5° C. have a Brookfield (RVT) viscosity of not above 50 mPas, preferably not above 40 mPas and particularly of a maximum of about 30 mPas. The esters used in the drilling mud having solidification values (pour and setting point) below −10° C., preferably below −15° C. and have at the same time flash points above 100° C., preferably above 150° C. The carboxylic acids present in the ester or ester mixture are straight-chain and/or branched and are of vegetable and/or synthetic origin. They can be derived from corresponding triglycerides such as coconut oil, palm kernel oil and/or babassu oil. The alcohol radicals of the esters used are derived in particular from straight-chain and/or branched saturated alcohols preferably with 6 to 10 carbon atoms. These alcohol components can also be of vegetable and/or animal origin and can thus be obtained by reductive hydration of corresponding carboxylic acid esters.

A further class of particularly suitable ester oils is derived from olefin mono- and/or poly-unsaturated monocarboxylic acids with 16 to 24 carbon atoms or their admixtures with lower amounts of other particularly saturated monocarboxylic acids and monofunctional alcohols with preferably 6 to 12 carbon atoms. These ester oils are also fluid and pumpable in the temperature range of 0° to 5° C. Particularly suitable are such esters derived to more than 70% by weight, preferably to more than 80% by weight and in particular to more than 90% by weight from olefin-unsaturated carboxylic acids with between 16 and 24 carbon atoms.

Here too the solidification values (pour and setting point) lie below −10° C. preferably below −15° C. while the flash points lie above 100° C. and preferably above 160° C. In the temperature range of 0° to 5° C. the esters used in the drilling mud have a Brookfield (RVT) viscosity of not more than 55 mPas, preferably not more than 45 mPas.

Two subclasses can be defined for the ester oils of the type in question. In the first, the unsaturated $C_{16-24}$-monocarboxylic acid radicals present in the ester are derived to not more than 35% by weight from olefin di- and poly-unsaturated acids, with preferably at least about 60% by weight of the acid radicals being olefin mono-unsaturated. In the second embodiment of $C_{16-24}$-monocarboxylic acids present in the ester mixture are derived at more than 45% by weight, preferably at more than 55% by weight from olefin di- and/or poly-unsaturated acids. It is useful if the saturated carboxylic acids with between 16 to 18 carbon atoms which are present in the ester mixture do not amount to more than about 20% by weight and in particular not more than about 10% by weight. Preferably, saturated carboxylic acid esters, however, have lower carbon numbers in the acid radicals. The carboxylic acid radicals present can be of vegetable and/or animal origin. Vegetable starting materials are, for example, palm oil, peanut oil, castor oil and in particular rapeseed oil. The carboxylic acids of animal origin are particularly corresponding mixtures of fish oils, such as herring oil.

Suitable mixture components are finally however the esters from monocarboxylic acids of synthetic and/or natural origin with 6 to 11 carbon atoms and mono- and/or polyfunctional alcohols, described in the copending Application . . . (D8607 "Ester or Carboxylic Acids of Medium Chain-Length as a Component of the 0.1 Phase in Invert Dulling Mud.") which are preferably also fluid and pumpable in the temperature range of 0° to 5° C. For completion of the invention disclosure, reference is thus made in this regard to the above copending Application, the contents of which are hereby also made subject of the present disclosure.

FURTHER MIXTURE COMPONENTS OF THE INVERT DRILLING FLUID

All the usual constituents of mixtures for conditioning and for the practical uses of invert drilling muds can be considered here, that are currently used with mineral oils as the continuous oil phase. In addition to the dispersed aqueous phase, emulsifiers, weighting agents, fluid-loss additives, viscosifiers and alkali reserves can be considered here.

Use is also made in a particularly important embodiment of the invention, of the further development of these ester oil-base invert drilling fluids which is the subject of the Applicant's earlier Application . . . (U.S. Ser. No. 07/418,184 titled "Oleophilic Basic Compound As An Additive For Invent Drilling Muds") now abandoned.

The teaching of this earlier Application is based on the concept of using a further additive in ester oil-base invert-drilling fluids, which is suited to keeping the desired rheological properties of the drilling fluid in the required range even when, in use, increasingly large amounts of free carboxylic acids are formed by partial ester hydrolysis. These liberated carboxylic acids should not only be trapped in a harmless form, it should moreover be possible to reform these free carboxylic acids, preferably into valuable components with stabilizing or emulsifying properties for the whole system. According to this teaching, alkaline amine compounds of marked oleophilic nature and at best limited water solubility, which are capable of forming salts with carboxylic acids, can be used as additives in the oil phase. The oleophilic amine compounds can at the same time be used at least in part as alkali reserves in the invert drilling fluid, they can however also be used in combination with conventional alkali reserves, particularly together with lime. The use of oleophilic amine compounds which are at least largely free from aromatic constituents is preferred. In particular, optionally olefin unsaturated aliphatic, cycloaliphatic and/or heterocyclic oleophilic basic amine compounds, can be considered, which contain one or more N-groups capable of forming salts with carboxylic acids. In a preferred embodiment the water-solubility of these amine compound at room temperature is at most about 5% by weight and is most preferably below 1% by weight.

Typical examples of such amine compounds are primary, secondary and/or tertiary amines, which are at least predominantly water-insoluble, and which can also to a limited extent be alkoxylated and/or substituted particularly with hydroxyl groups. Further examples are corresponding aminoamides and/or heterocycles containing nitrogen as ring constituent. For example, basic amine compounds are suitable which have at least one long-chain hydrocarbon radical with preferably 8 to 36 carbon atoms, particularly with 10 to 24 carbon atoms, which can also be olefin mono- or polyunsaturated. The oleophilic basic amine compounds can be added to the drilling fluid in amounts of up to about 10 lb/bbl, preferably in amounts up to about 5 bbl and particularly in the range of about 0.1 to 2 bbl.

It has emerged that the use of such oleophilic basic amine compounds can effectively prevent thickening of the mud system, which presumably can be attributed to a disturbance in the W/O invert system and also to the formation of free carboxylic acids by ester hydrolysis.

If the context of the invention teaching, esters of longer-chain carboxylic acids are used as mixture components, which on hydrolytic cleavage yield fatty acids or fatty-acid salts with a pronounced O/W-emulsifying effect, then in the method according to the invention the measures regarding the alkali reserves should also be taken into consideration as described in detail in the aforementioned earlier Applications P 38 42 659.5 and P 38 42 703.6 in association with such problems. When such ester mixtures are used the following applies:

In a preferred embodiment of the use according to the invention, care is taken not to use considerable amounts of strongly hydrophilic bases of inorganic and/or organic nature in the oil-base mud. In particular the invention refrains from using alkali hydroxides or strongly hydrophilic amines such as diethanolamine and/or triethanolamine. Lime can be also used effectively as an alkali reserve. It is then useful to limit the maximum amount of lime to be used to about 2 lb/bbl, and it may be preferred to work with lime contents in the drilling mud slightly below this, e.g., therefore, from about 1 to 1.8 lb/bbl (lime/drilling fluid). Other known alkali reserves can be used in addition to or in place of the lime. The less basic metal oxides, such as zinc oxide, should particularly be mentioned here. Even when these acid traps are used, care still taken that the amounts are not too large, so as to prevent undesired premature ageing of the drilling fluid, associated with an increase in viscosity and therefore a deterioration in the rheological properties. The special features discussed here of the process according to the invention prevent, or at least restrict, the formation of undesirable amounts of highly active O/W-emulsifiers, so that the good rheological properties are maintained for a sufficiently long time in use, even when there is thermal ageing.

The following also applies:

Invert-drilling muds of the type in question here usually contain, together with the continuous oil phase, the finely dispersed aqueous phase in amounts of about 5 to 45% by weight and preferably in amounts of about 5 to 25% by weight. A dispersed aqueous phase from about 10 to 25% by weight can be regarded as particularly useful.

The following rheological data apply to the rheology of preferred invert drilling muds according to the invention: Plastic viscosity (PV) from about 10 to 60 mPas, preferably about 15 to 40 mPas. Yield point (YP) from about 5 to 40 lb/100 ft$^2$, preferably about 10 to 25 lb/100 ft—each measurement at 50° C. For the measurement of these parameters, for the measuring methods used and for the rest of the conventional composition of the invert drilling fluids described here, refer in detail to the specifications in the prior art which were cited above and are, for example, described fully in the handbook "Manual of Drilling Fluids Technology" of NL-baroid Co., London GB, particularly in the chapters "Mud Testing—Tools and Techniques" and "Oil Mud Technology", which is freely accessible to interested experts. In summary, for the purposes of completely the invention disclosure the following can be said:

The emulsifiers which can be used in practice are systems which are suitable for the formation of the required W/O emulsions. In particular, selected oleophilic fatty acid salts, for example, those based on amidoamine compounds can be considered. Examples of these are described in the already cited U.S. Pat. No. 4,374,737 and the literature cited there. A particularly suitable type of emulsifier is the product sold by NL-Baroid Co. under the brand name "EZ-mul".

Emulsifiers of the type in question are sold commercially as highly concentrated active-substance preparations and can, for example, be used in amounts of about 2.5 to 5% by weight, particularly in amounts of about 3 to 4% by weight—each based on the ester oil phase.

In practice, hydrophobized lignite in particular is used as the fluid-loss additive and therefore particularly for forming a dense coating on the bore-hole walls of a largely liquid-impermeable film. Suitable amounts are, for example, from about 15 to 20 lb/bbl or from about 5 to 7% by weight, based on the ester oil phase.

The viscosifier conventionally used in drilling fluids of the type in question here, is a cation-modified finely particulate bentonite, which can be used particularly in amounts of about 8 to 10 lb/bbl or from about 2 to 4% by weight, based on the ester oil phase. The weighting material conventionally used in relevant applications to establish the necessary pressure compensation is barite, and the amounts added are varied according to the drilling conditions anticipated in each case. It is, for example, possible by adding barite to raise the specific gravity of the drilling fluid to values up to 2.5 and preferably from about 1.3 to 1.6.

The dispersed aqueous phase in these invert drilling fluids, is loaded with soluble salts. Calcium chloride and/or potassium chloride are mainly used here, and saturation of the aqueous phase with the soluble salt at room temperature is preferred.

The aforementioned emulsifiers or emulsifier systems can optionally also be used to improve the oil wettability of the inorganic weighting materials. In addition to the aminoamides already mentioned compounds. Additional information regarding the relevant prior art can be found in the following publications: GB 2 158 437, EP 229 912 and DE 32 47 123.

The drilling fluids synthesized according to the invention using ester oils of the type described are distinguished, in addition to the advantages already described, by a notably improved lubricity. This is particularly important when in very deep wells, for example, the path of the drill rod and therefore the borehole deviates from the vertical. The rotating drill rod comes slightly into contact with the borehole wall and when operating buries itself into it. Ester oils of the type used as the oil phase according to the invention have a notably better lubricity than the mineral oils previously used. This is another important advantage of the method according to the invention.

EXAMPLES

In the following examples invert drilling fluids are prepared in the conventional manner using the following basic formulation:

| | |
|---|---|
| 230 ml | ester oil |
| 26 ml | water |
| 6 g | organophilic bentonite (Geltone II of NL Baroid Co.) |
| 12 g | organophilic lignite (Duratone of NL Baroid Co.) |
| x g | lime (x = 1 or 2) |
| 6 g | W/O emulsifier (EZ-mul NT of NL Baroid Co.) |
| 346 g | barite |
| 9.2 g | $CaCl_2 \times 2\, H_2O$ |

In this formulation about 1.35 g of lime corresponds to 2 lb/bbl.

After a W/O invert drilling fluid has been prepared in a known manner from the components used, with variation of the ester oil phase, the viscosities of the unaged and then the aged material are determined as follows:

Measurement of the viscosity at 50° C. in a Fann-35-viscosimeter supplied by NL Baroid Co. The plastic viscosity (PV), the yield point (YP) and the gel strengths (lb/100 ft$^2$) are determined in a known manner after 10 sec. and 10 min.

Ageing is carried out by treatment in autoclaves—in the so-called roller-oven—for a period of 16 hours at 125° C.

Isotridecyl acetate which has the following rheological characteristics is used as the ester oil: viscosity at 20° C. 5 mPas; viscosity at 50° C. 2.1 mPas; setting point below −10° C. In Example 1 below, the amount of lime used in the basic information is 2 g, in Example 2 this lime amount is reduced to 1 g.

The values determined for the unaged and aged material are listed in the following table.

| | unaged material | aged material |
|---|---|---|
| plastic viscosity (PV) | 31 | 33 |
| yield point (YP) | 11 | 13 |
| gel strengths (lb/100 ft$^2$) | | |
| 10 sec. | 6 | 7 |
| 10 min. | 9 | 9 |

Example 2

| | unaged material | aged material |
|---|---|---|
| plastic viscosity (PV) | 24 | 25 |
| yield point (YP) | 14 | 12 |
| gel strengths (lb/100 ft$^2$) | | |
| 10 sec. | 5 | 5 |
| 10 min. | 8 | 7 |

The basic formulation in Examples 1 and 2 has a value of 90/10 for the oil phase/water weight ratio. In further tests the ester oil/water ratio is changed to 80/20.

In Examples 3 and 4 below, invert drilling fluids are prepared using the ester oil based on isotridecyl acetate, according to the following basic formulation:

| | |
|---|---|
| 210 ml | ester oil |
| 48.2 g | water |
| 6 g | organophilic bentonite (Omnigel) |
| 13 g | organophilic lignite (Duratone of NL Baroid Co.) |
| 2 g | lime |
| 8 g | W/O-emulsifier (EZ-mul NT of NL Baroid Co.) |
| 270 g | barite |
| 20 g | $CaCl_2 \times 2\, H_2O$ |

As in Examples 1 and 2, the viscosities are determined first on the unaged, then on the aged material (16 hours at 125° C. in the roller oven) (Example 3).

In a further test formulation (Example 4), 2 g of a strongly oleophilic amine is added to the basic formulation given for Example 3 (Applicant's commercial product "Araphen G2D"—the reaction product of an epoxidized $C_{12/14}$-alpha-olefin and diethanolamine). The viscosity characteristics are then determined as above first on the unaged and then on the aged material.

Example 3

| | unaged material | aged material |
|---|---|---|
| plastic viscosity (PV) | 34 | 36 |
| yield point (YP) | 52 | 51 |
| gel strengths (lb/100 ft$^2$) | | |
| 10 sec. | 25 | 23 |
| 10 min. | 37 | 35 |

Example 4

| | unaged material | aged material |
|---|---|---|
| plastic viscosity (PV) | 31 | 34 |
| yield point (YP) | 36 | 32 |
| gel strengths (lb/100 ft$^2$) | | |
| 10 sec. | 14 | 13 |
| 10 min. | 17 | 15 |

Example 5

The ester-mixture from acetic acid and a $C_{6-10}$-alcohol cut (Applicant's commercial product "Lorol technish"), prepared by the reduction of the corresponding pre-fatty-acid cut of natural origin, is used as the ester oil. The basic formulation for the ester mud corresponds to the formulation given from Example 2.

The viscosity data are determined and the ageing is carried out as indicated in the previous Examples. The following viscosities are determined.

| | unaged material | aged material |
|---|---|---|
| plastic viscosity (PV) | 28 | 29 |
| yield point (YP) | 17 | 20 |
| gel strengths (lb/100 ft$^2$) | | |
| 10 sec. | 9 | 9 |
| 10 min. | 24 | 14 |

Examples 6 to 8

In parallel formulations, three drilling fluids based on isotridecyl acetate are produced according to the basic formulations in Examples 1 and 2 (oil phase/water=90/10). As in the preceding Examples, their rheological data was determined immediately after preparation and after ageing in the roller oven at 125° C. for a period of 16 hours.

In a first mud, no lime is added (Example 6), in a second mud (Example 7) 2 g of lime is used, while in the parallel third mud (Example 8) 2 g of lime is used together with 1 g of the strongly oleophilic amine "Araphen G2D".

The rheological data determined in each case are as follows:

Example 6

|  | unaged material | aged material |
|---|---|---|
| plastic viscosity (PV) | 28 | 30 |
| yield point (YP) | 15 | 9 |
| gel strengths (lb/100 ft²) |  |  |
| 10 sec. | 9 | 7 |
| 10 min. | 10 | 8 |

Example 7

|  | unaged material | aged material |
|---|---|---|
| plastic viscosity (PV) | 30 | 29 |
| yield point (YP) | 13 | 17 |
| gel strengths (lb/100 ft²) |  |  |
| 10 sec. | 8 | 8 |
| 10 min. | 10 | 12 |

Example 8

|  | unaged material | aged material |
|---|---|---|
| plastic viscosity (PV) | 25 | 25 |
| yield point (YP) | 12 | 8 |
| gel strengths (lb/100 ft²) |  |  |
| 10 sec. | 8 | 7 |
| 10 min. | 11 | 9 |

Examples 9 to 11

In a further comparative series of tests, drilling fluids based on isotridecyl acetate are combined in the basic formulation of Examples 6 to 8 as follows: Example 9 addition of 1 g of lime; Example 10 addition of 2 g of lime; Example 11 addition of 2 g of lime + 1 g of "Araphen G2D".

These muds are then aged, however, in the roller oven at 125° C. for a period of 72 hours. The rheological data determined on the unaged and aged material in each case are as follows:

Example 9

|  | unaged material | aged material |
|---|---|---|
| plastic viscosity (PV) | 30 | 37 |
| yield point (YP) | 15 | 16 |
| gel strengths (lb/100 ft²) |  |  |
| 10 sec. | 7 | 7 |
| 10 min. | 11 | 10 |

Example 10

|  | unaged material | aged material |
|---|---|---|
| plastic viscosity (PV) | 28 | 34 |
| yield point (YP) | 16 | 13 |
| gel strengths (lb/100 ft²) |  |  |
| 10 sec. | 6 | 6 |
| 10 min. | 10 | 10 |

Example 11

|  | unaged material | aged material |
|---|---|---|
| plastic viscosity (PV) | 29 | 36 |
| yield point (YP) | 11 | 14 |
| gel strengths (lb/100 ft²) |  |  |
| 10 sec. | 7 | 6 |
| 10 min. | 10 | 10 |

We claim:

1. A drilling fluid suitable for use in an invert emulsion drilling mud composition for the environmentally-compatible development of petroleum or natural gas deposits, said fluid having an oil phase and an aqueous phase, said oil phase comprising an ester oil of a $C_1$-$C_5$ monocarboxylic acid and a mono- or polyfunctional alcohol, said ester oil being fluid at room temperature and having a flash point above 80° C., and said aqueous phase being dispersed in said oil phase.

2. A drilling fluid as in claim 1 wherein said ester oil comprises an ester of a $C_1$-$C_5$ monocarboxylic acid and a monofunctional alcohol having at least 8 carbon atoms.

3. A drilling fluid as in claim 2 wherein said monocarboxylic acid comprises acetic acid.

4. A drilling fluid as in claim 1 wherein said ester oil comprises an ester of a $C_1$14 $C_5$ monocarboxylic acid and a polyfunctional alcohol having 2 to 6 carbon atoms.

5. A drilling fluid as in claim 1 wherein said drilling fluid contains another ecologically acceptable oil selected from the group consisting of (a) a monocarboxylic acid ester of a $C_2$-$C_{12}$ monofunctional alkanol wherein the monocarboxylic acid contains from 12 to 16 carbon atoms and is aliphatically saturated, and (b) a monocarboxylic acid ester of a $C_2$-$C_{12}$ monofunctional alcohol wherein the monocarboxylic acid contains from 16 to 24 carbon atoms and is olefinically mono- or poly-unsaturated.

6. An invert emulsion drilling mud composition suitable for environmentally-compatible development of petroleum and natural gas deposits, comprising
   (a) a continuous oil phase containing an ester of a $C_1$-$C_5$ monocarboxylic acid and a mono- or polyfunctional alcohol, said ester being fluid at room temperature and having a flash point above 80° C.,
   (b) an aqueous phase dispersed in said oil phase,
   (c) a water-in-oil emulsifier,
   (d) a weighting agent,
   (e) a viscosifier,
   (f) a fluid loss additive, and
   (g) an alkali reserve component.

7. An invert emulsion drilling mud composition as in claim 6 wherein said ester has a Brookfield (RVT) viscosity of less than about 50 mPas at a temperature of about 0 to about 5° C.

8. An invert emulsion drilling mud composition as in claim 6 wherein said ester has a pour and setting value of below 0° C. and a flash point above 90° C.

9. An invert emulsion drilling mud composition as in claim 6 wherein said ester is prepared from a monofunctional alcohol having at least 6 carbon atoms, or from a di- to tetrahydric alcohol having from 2 to 6 carbon atoms.

10. The process of developing sources of oil and gas by drilling using a different mud, comprising pumping the invert emulsion drilling mud into said sources being drilled.

11. An invert emulsion drilling mud composition as in claim 6 wherein said ester of a $C_1$-$C_5$ monocarboxylic acid and a mono- or polyfunctional alcohol is present in an amount of at least about 50 percent by weight, based on the weight of said oil phase.

12. An invert emulsion drilling mud composition as in claim 6 wherein said oil phase comprises an ester of a $C_1$-$C_5$ monocarboxylic acid and a monofunctional alcohol having at least 8 carbon atoms.

13. An invert emulsion drilling mud composition as in claim 12 wherein said monocarboxylic acid comprises acetic acid.

14. The process of developing sources of oil and gas by drilling using a drilling mud, comprising pumping the invert emulsion drilling mud composition of claim 12 into said sources being drilled.

15. An invert emulsion drilling mud composition as in claim 6 wherein said oil phase comprises an ester of a $C_1$-$C_5$ monocarboxylic acid and a polyfunctional alcohol having 2 to 6 carbon atoms.

16. An invert emulsion drilling mud composition as in claim 15 wherein said polyfunctional alcohol is selected from glycols and propanediols.

17. The process of developing sources of oil and gas by drilling using a drilling mud, comprising pumping the invert emulsion drilling mud composition of claim 14 into said sources being drilled.

18. An invert emulsion drilling mud composition as in claim 6 wherein said ester of a $C_1$-$C_5$ monocarboxylic acid and a mono- or polyfunctional alcohol is present in an amount of at least about 25 percent by weight, based on the weight of said oil phase.

19. The process of developing sources of oil and gas by drilling using a drilling mud, comprising pumping the invert emulsion drilling mud composition of claim 18 into said sources being drilled.

20. An invert emulsion drilling mud composition as in claim 6 wherein said oil phase contains another ecologically acceptable oil selected from the group consisting of (a) a monocarboxylic acid ester of a $C_2$-$C_{12}$ monofunctional alkanol wherein the monocarboxylic acid contains from 12 to 16 carbon atoms and is aliphatically saturated, and (b) a monocarboxylic acid ester of a $C_2$-$C_{12}$ monofunctional alcohol wherein the monocarboxylic acid contains from 16 to 24 carbon atoms and is olefinically mono- or poly-unsaturated.

21. The process of developing sources of oil and gas by drilling using a drilling mud, comprising pumping the invert emulsion drilling mud composition of claim 20 into said sources being drilled.

22. An invert emulsion drilling mud composition as in claim 6 wherein said alkali reserve component is substantially free from highly hydrophilic basic materials selected from the group consisting of alkali metal hydroxides and amines selected from diethanolamine and triethanolamine.

23. The process of developing sources of oil and gas by drilling using a drilling mud, comprising pumping the invert emulsion drilling mud composition of claim 22 into said sources being drilled.

24. An invert emulsion drilling mud composition as in claim 6 wherein said alkali reserve component is selected from a mildly alkaline metal oxide, an oleophilic basic amine, and lime.

25. The process of developing sources of oil and gas by drilling using a drilling mud, comprising pumping the invert emulsion drilling mud composition of claim 24 into said sources being drilled.

26. An invert emulsion drilling mud composition as in claim 24 wherein said lime is present in an amount of less than about 2 lbs/barrel of said drilling mud composition.

27. An invert emulsion drilling mud composition as in claim 6 wherein said aqueous phase is present in an amount of from about 5 to about 45 percent by weight, based on the weight of said oil phase.

28. The process of developing sources of oil and gas by drilling using a drilling mud, comprising pumping the invert emulsion drilling mud composition of claim 27 into said sources being drilled.

29. An invert emulsion drilling mud composition as in claim 6 having a plastic viscosity of from about 10 to about 60 mPas, and a yield point of from about 5 to about 40 lbs/100 ft.$^2$. each measured at about 50° C.

30. The process of developing sources of oil and gas by drilling using a drilling mud, comprising pumping the invert emulsion drilling mud composition of claim 29 into said sources being drilled.

* * * * *

UNITED STATES PATENT AND TRADEMARK OFFICE
CERTIFICATE OF CORRECTION

PATENT NO. : 5,318,954
DATED : June 7, 1994
INVENTOR(S) : Mueller et. al.

It is certified that error appears in the above-indentified patent and that said Letters Patent is hereby corrected as shown below:

In claim 4, column 12, line 29, "$C_114C_5$", should read:
-- $C_1-C_5$ --.

In claim 10, column 12, line 68, "different", should read:
-- drilling --.

In claim 10, column 13, line 1, after mud insert:
-- composition of claim 6 --.

In claim 17, column 13, line 29, "claim 14", should read:
-- claim 15 --.

Signed and Sealed this

Twenty-eight Day of March, 1995

Attest:

BRUCE LEHMAN

Attesting Officer

Commissioner of Patents and Trademarks

Disclaimer 5,318,954—Heinz Mueller, Monheim; Claus-Peter Herold, Mettmann; Stephan von Tapavicza, Erkrath; Michael Neuss, Cologne; Frank Burbach, Meersbusch, all of Fed. Rep. of Germany. USE OF SELECTED ESTER OILS OF LOW CARBOXYLIC ACIDS IN DRILLING FLUIDS. Patent dated June 7, 1994. Disclaimer filed July 17, 1997, by the assignee, Baroid Limited.

The term of this patent shall not extend beyond the expiration date of Patent No. 5,254,531 and 5,403,822.

*(Official Gazette,* November 4, 1997)

UNITED STATES PATENT AND TRADEMARK OFFICE
Certificate

Patent No. 5,318,954                                                             Patented: June 7, 1994

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Heinz Mueller, Monheim, Germany; Claus-Peter Herold, Mettmann, Germany; Stephan von Tapavicza, Erkrath, Germany; Michael Neuss, Koeln, Germany; Frank Burbach, Meerbusch, Germany; and Douglas J. Grimes, Stonehaven, Scotland.

Signed and Sealed this Twenty-fourth Day of June 2003.

JAMES O. WILSON
*Supervisory Patent Examiner*
Art Unit 1623